United States Patent [19]

Helmes et al.

[11] Patent Number: 4,610,340
[45] Date of Patent: Sep. 9, 1986

[54] OVERLOAD SAFETY ON CLUTCHES

[75] Inventors: Ludger Helmes, Velbert; Rolf-Jürgen Krämer, Wuppertal, both of Fed. Rep. of Germany

[73] Assignee: Vorwerk & Co. Interholding GmbH, Wuppertal, Fed. Rep. of Germany

[21] Appl. No.: 547,315

[22] Filed: Oct. 31, 1983

[30] Foreign Application Priority Data

Nov. 13, 1982 [DE] Fed. Rep. of Germany ....... 3242046
Oct. 1, 1983 [DE] Fed. Rep. of Germany ....... 3335729

[51] Int. Cl.⁴ ............................................. F16D 7/02
[52] U.S. Cl. ..................................... 192/56 R; 464/35; 464/100
[58] Field of Search ............... 192/54, 55, 56 R, 93 R, 192/92; 464/35, 34, 37, 100, 101

[56] References Cited

U.S. PATENT DOCUMENTS

| | | | |
|---|---|---|---|
| 913,475 | 2/1909 | Dryden | 464/35 X |
| 1,704,503 | 3/1929 | Gamble | 192/55 X |
| 1,896,025 | 1/1933 | Griswold | 192/55 X |
| 1,962,993 | 6/1934 | Leece | 64/96 |
| 2,023,690 | 12/1935 | Lyman | 192/54 |
| 2,143,710 | 1/1939 | Murray | 192/54 |
| 2,461,447 | 2/1949 | Siesel . | |
| 2,493,232 | 1/1950 | Dodge | 192/56 R X |
| 2,637,987 | 5/1953 | Hill et al. | 192/56 R |
| 2,688,857 | 9/1954 | Jones . | |
| 2,826,903 | 3/1958 | Gerstung . | |
| 2,854,830 | 10/1958 | Steinbrecker et al. | 64/29 |
| 3,618,310 | 11/1971 | Balchunas . | |
| 3,752,277 | 8/1973 | Nakai | 192/56 R |
| 4,043,437 | 8/1977 | Taylor | 192/13 R |
| 4,327,563 | 5/1982 | Allmacher | 464/37 |

FOREIGN PATENT DOCUMENTS

| | | |
|---|---|---|
| 809877 | 8/1951 | Fed. Rep. of Germany . |
| 1182910 | 12/1964 | Fed. Rep. of Germany . |
| 2062595 | 6/1972 | Fed. Rep. of Germany . |
| 2853900 | 6/1980 | Fed. Rep. of Germany ........ 192/55 |
| 3032637 | 4/1981 | Fed. Rep. of Germany ........ 464/34 |
| 1034596 | 7/1953 | France . |
| 2055158 | 5/1971 | France . |
| 2221975 | 10/1974 | France . |
| 44-15701 | 7/1969 | Japan ............................... 192/56 R |
| 57604 | 9/1934 | Norway ............................... 464/35 |
| 43430 | 8/1960 | Poland ............................... 192/56 |
| 661643 | 11/1951 | United Kingdom . |
| 809520 | 2/1959 | United Kingdom ............. 192/56 R |
| 396480 | 8/1973 | U.S.S.R. ............................ 464/37 |
| 451876 | 3/1975 | U.S.S.R. ........................... 192/56 R |
| 868177 | 9/1981 | U.S.S.R. ........................... 192/56 R |

OTHER PUBLICATIONS

"Hutte", Engineers-Paperback II, 27 Edition, pp. 162-165.

*Primary Examiner*—Samuel Scott
*Assistant Examiner*—Carl D. Price
*Attorney, Agent, or Firm*—Martin A. Farber

[57] ABSTRACT

An overload safety for clutches of the type having driven and drive elements arranged concentrically to each other and having a driver body which cooperates with a spring and is provided in the space between the elements. In order to obtain a small structural form which is simple to manufacture while of dependable operation, the disengaged position is obtained by the bending out of a resiliency section which crosses the space between the elements.

6 Claims, 12 Drawing Figures

OVERLOAD SAFETY ON CLUTCHES

The invention relates to an overload safety on clutches having driving and driven elements arranged concentrically to each other and having a driver body arranged in the space between said elements and cooperating with a spring.

Overload safeties are known in which the cylindrically shaped driver body is articulated for rotation to one arm of a double-armed lever and extends into a notch-like depression in a ring surrounding it ("Hütte", des Ingenieurs Taschenbuch II, 27th edition). The other arm of the lever is acted on by a tension spring which urges the driver body in the direction of engagement. When the limit moment is exceeded, the driver body disengages from the depression and thus separates the primary and secondary drives. This development is expensive in construction and requires a large amount of space. Therefore it is not very suitable for use in small motor-driven appliances.

The object of the invention is to develop an overload safety of the above-indicated type in such a way that while of small structural shape it operates reliably and is simple to manufacture.

This object is achieved in the manner that the uncoupling position is obtained by the bending out of a resiliency section which crosses the intermediate space.

The advantages of the apparatus in accordance with the invention consist essentially in the particularly simple development and the small amount of space taken up. Accordingly, this overload safety can be used advantageously on clutches in small motor-driven electric appliances. Up to a given transmission torque, the power is transmitted without slippage. If a predetermined limit torque is exceeded, the driver body presses aside the resiliency section which crosses the intermediate space and can then rotate without driving action. Upon further rotation, the driver body can immediately again pass through the resiliency section if the overload rotary torque has not yet dropped below the maximum permissible value. The striking noise between driver body and resiliency section which occurs in this case serves as acoustic warning signal for the user of the appliance. His attention is thereby directed to the fact that he should turn off the appliance. The electric motor and the drive elements are therefore protected and the life of the appliance is increased. After elimination of the source of disturbance, the overload safety is ready for use without any special manipulation. The transmission range of the clutch can be determined by the position and development of the resiliency section. A lubricant may possibly also be added.

One advantageous further aspect of the invention resides in the fact that the space between drive and driven elements is embodied as an annular space, the cross section of which is reduced at least one place by a resiliency section to a size smaller than the diameter of the driver body traveling in the annular space. Accordingly, the driver body can be developed as a rolling body. Different types of rolling bodies can be used. They can, for instance, have the form of a barrel, roller or ball. For variation of the drive ratios, adjustability of the resiliency section can also be provided.

In one particularly favorable embodiment the resiliency section is a leaf spring arranged as a secant to the annular space. This can be done at low cost and it can be installed readily from an assembly standpoint.

One variant is characterized by the fact that a plurality of leaf springs, lying at an angle to each other, are arranged one behind the other in the circumferential direction of the annular space. In this way, the driver body is held form-locked in clamped position after the engagement jerk. The arrangement of the leaf springs can be such that the reduction in cross section increases.

A particularly simple manner of installing the leaf spring consists of placing it in a slot in the wall of a bushing whose inner surface forms the wall of the annular space, the bushing forming the drive element.

It is furthermore possible to form the resiliency section by a leaf spring which extends spirally into the annular space, in order to obtain an impact-free coupling of the driver body.

An advantageous embodiment also resides in providing an outwardly directed evasion space for the driver body behind the place of reduced cross section. After the limit moment has been exceeded, the driving and driven elements still rotate for a time with the drive speed. However, immediately after the disengagement or passing through the resiliency section, the driver body is pressed by centrifugal force against the outer race and passes into the evasion space, it thus no longer having any contact with the driven element and rotating entirely freely in this position together with the drive. After the disconnecting of the appliance, the driver body is still in the evasion space. Only the engagement jerk, caused by the inertia of the driver body, leads again to the carrying along of the driver body and thus to the engagement of the clutch.

Another structural form, in which the manufacture is further simplified, the cost of assembly is less and there is less wear in operation, is characterized by the fact that the driver body is formed by a cam which is associated with the drive shaft and the vertex height of which is greater than the dimension of the annular space in its region of reduced cross section. Better drive ratios exist with this structural shape, due to the larger drive surface between cam and resiliency section in the coupled position. If the maximum force which is limited by the vertex height of the cam, the arrangement of the resiliency section and its spring strength is exceeded, the cam, after the bending out of the resiliency section, moves forward in the direction of rotation of said section. Until the contact of the cam with the resiliency section is renewed, no contact takes place between the two parts, so that the transmission system operates further without friction. Upon its further rotation, the cam again comes into contact with the resiliency section and the transmission system is again in engagement. If the load torque has still not dropped below the maximum permissible value, then the process described above is repeated. The noise resulting therefrom calls the attention of the user to the fact that there is too great a load, which causes him to shut off the apparatus which is provided with the corresponding overload safety. Since the cam rotates together with the drive shaft, the overload safety operates with only slight wear. The main friction is produced exclusively in the region between cam and resiliency section.

Manufacturing advantages result from this if the cam is developed as a protrusion on a ring which is arranged fixed for rotation on the drive shaft.

Another structural shape consists in developing the resiliency section as a bimetallic strip in such a manner that the heating which results from the sliding movement between resiliency section and cam bends the resiliency section into the disengagement position. This heating takes place only upon repeated sliding of the cam under the bimetallic strip. The transmission system is then completely disengaged until the bimetallic strip has again cooled down. The bimetallic strip is arranged in such a manner that the metal strip of greater expansion faces away from the cam. Both ends of the bimetallic strip can be anchored firmly. It is more favorable, however, if only one end is fixed while the other end is displaceable.

With the above and other objects and advantages in view, the present invention will become more clearly understood in connection with the detailed description of preferred embodiments, when considered with the accompanying drawings, of which:

Figure 1:
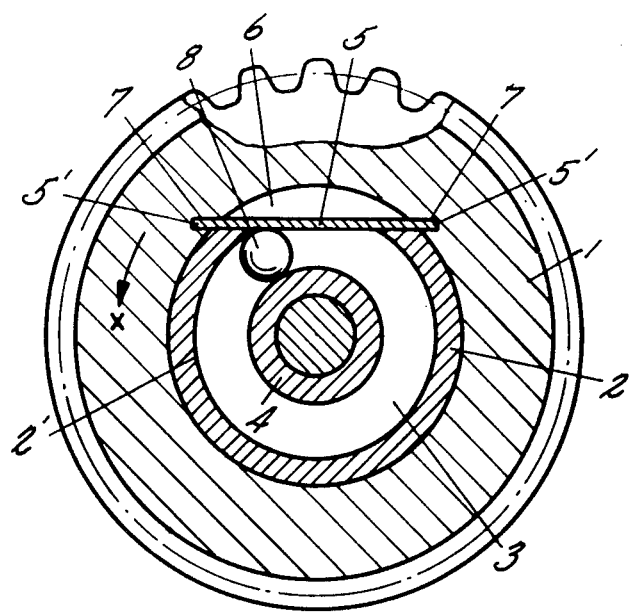
FIG. 1 is a cross section through a clutch according to the first embodiment, with the driver body in the coupling position.
Figure 2:
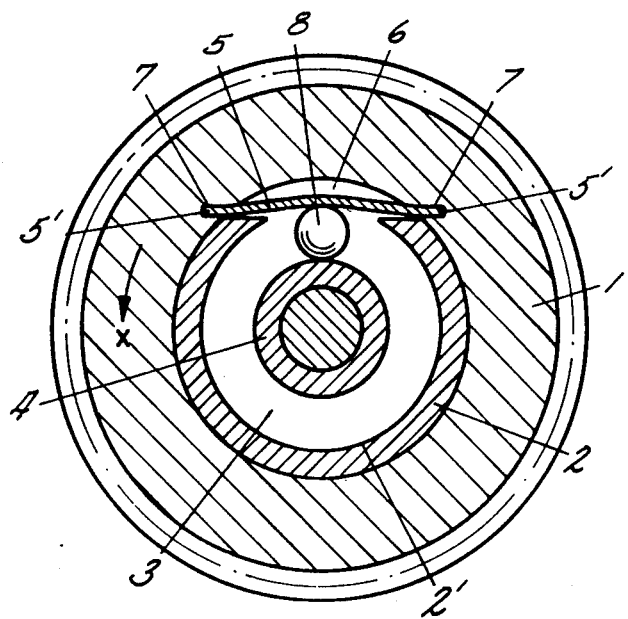
FIG. 2 is a showing corresponding to FIG. 1, with the driver body pressing the resiliency section outwards.

In accordance with the first embodiment, shown in FIGS. 1 and 2, the reference number 1 is a gear which is placed in rotation in the direction indicated by the arrow x by a transmission (not shown) of a small electric appliance. This gear 1 is seated, fixed for rotation, on a drive element 2 which is formed by a bushing and is arranged, leaving an annular space 3, concentric to a ring-like driven element 4. The cross section of the annular space 3 is reduced at one point by means of a resiliency section 5. In the present case, the resiliency section 5 is formed by a leaf spring which is arranged as a secant with respect to the annular space 3. This leaf spring lies in a slot 6 in the wall of the bushing 2, whose inner surface forms the wall 2' of the annular space. The slot 6 extends to insertion niches 7, extending into the gear 1, for the ends 5' of the leaf spring 5.

Within the annular space 3 there is a driver body 8 which is adapted in diameter to said space. The driver body is developed as a ball.

If the gear 1 is driven in the direction indicated by the arrow x, the driver body 8, upon the engagement jerk, passes into the wedged position between resiliency section 5 and driven element 4, as shown in FIG. 1. A slip-free transmission of the drive power to the driven element 4 then takes place. If the limit moment is reached, for instance due to greater resistance on the driven element 4, then the driver body 8 passes through the resiliency section 5 by pressing the latter into the slot 6 as shown in FIG. 2. The driver body 8 then passes again into the annular space 3 and, due to its inertia, again into the position shown in FIG. 1 and again passes through the region of the annular space 3 whose cross section is reduced by the leaf spring. A continuous striking noise is heard, which serves as acoustic warning signal for the user of the appliance.

Figure 3:
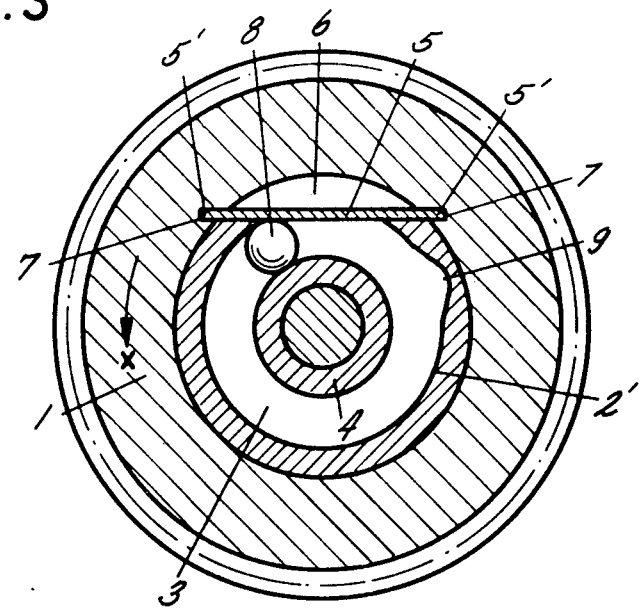
FIG. 3 is a cross section through the second embodiment of a clutch, with the driver body in the coupling position.
Figure 4:
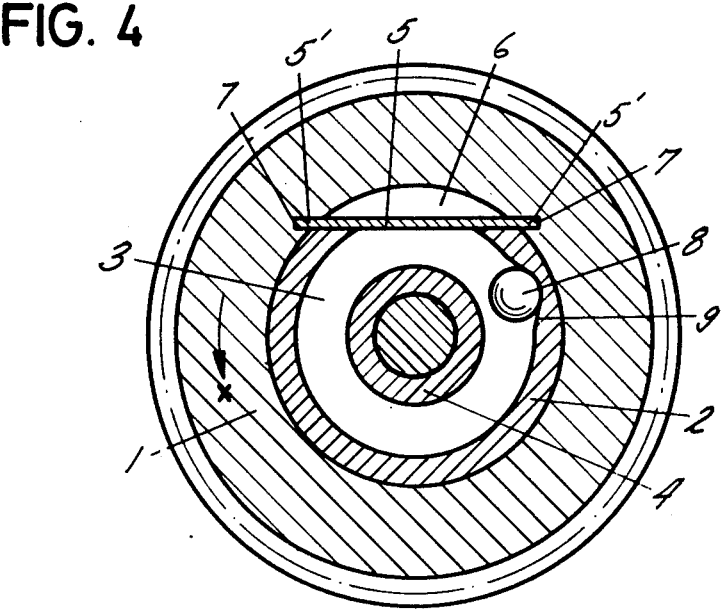
FIG. 4 is a showing corresponding to FIG. 3, in which the driver body, after having passed through the resiliency section, has entered the evasion space arranged behind the latter.

The construction of the clutch shown in FIGS. 3 and 4 corresponds essentially to the clutch of the first embodiment. Therefore the same structural parts have been given the same reference numbers. Differing from the first embodiment, an outwardly directed evasion space 9 for the driver body 8 is provided behind the place whose cross section is reduced by the leaf spring 5. The evasion space 9 is located in the wall 2' of the annular space and is adapted to the curvature of the driver body 8. After the exceeding of the limit moment, the driver body 8 passes into the evasion space 9 and remains there due to the centrifugal force of the rotating bushing 2. The evasion space 9 is deep enough that the driver body does not have any contact with the circumferential surface of the annular driven element 4. If the appliance is stopped when a limit moment is exceeded and then started again, the driver body 8, as a result of the engagement jerk, leaves the evasion space 9 and passes into the driving position shown in FIG. 3.

Figure 5:
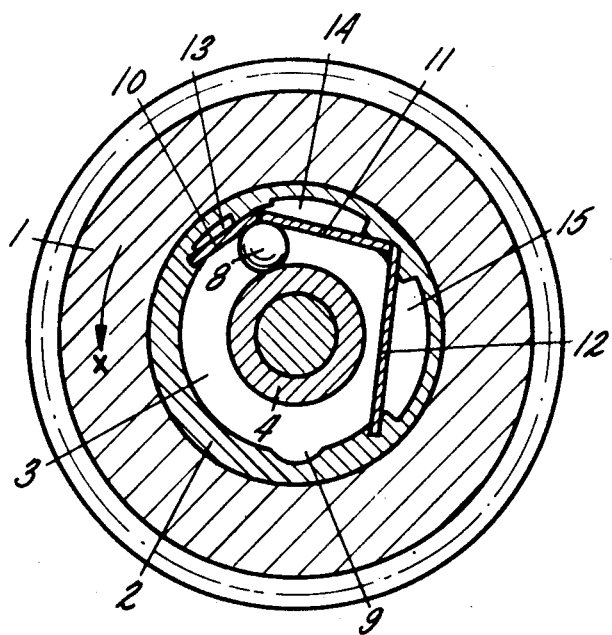
FIG. 5 shows, in cross section, the third embodiment of a clutch which has a plurality of leaf springs lying at an angle to each other, with the driver body in coupling position.
Figure 6:
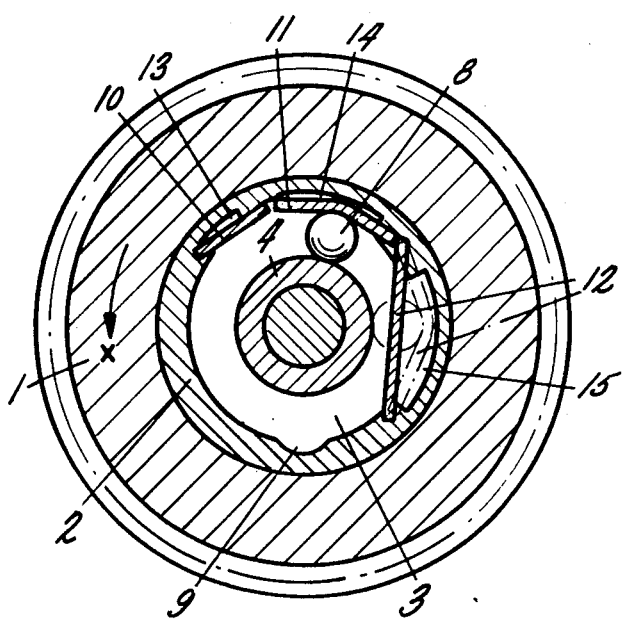
FIG. 6 is a sectional view corresponding to FIG. 5, with the driver body pressing a resiliency section outward.

The third embodiment, shown in FIGS. 5 and 6, is developed in a manner similar to the preceding one. Three leaf springs 10, 11 and 12 lying at an angle to each other are now provided. Each leaf spring 10, 11, 12 has its own evasion slot 13, 14, 15. Both the leaf springs 10–12 and the evasion slots 13–15 are of different length. In this way, it is possible for the shortest leaf spring 10 to produce a smaller reduction in cross section of the annular space 3. The following leaf springs 11, 12 lead to a step-wise reduction in cross section of the annular space 3, the reduction in cross section within the region of the leaf spring 12 being the greatest. The driver body 8, as shown in FIG. 6, must therefore pass through the successive reductions in cross section. After it has passed through all the reductions in cross section produced by the leaf-springs 10–12, it passes into a following evasion space 9.

Figure 7:
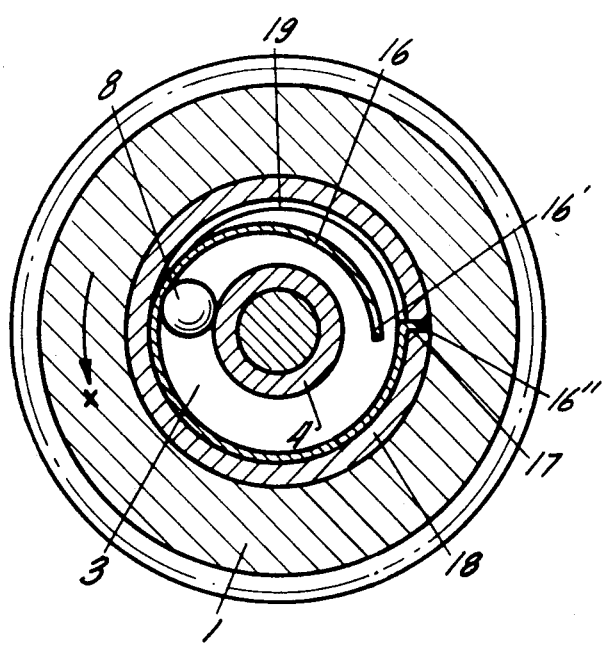
FIG. 7 is a cross section through the clutch according to the fourth embodiment, in which the resiliency section is formed by a leaf spring which extends spirally into the annular space, shown in the coupling position.
Figure 8:
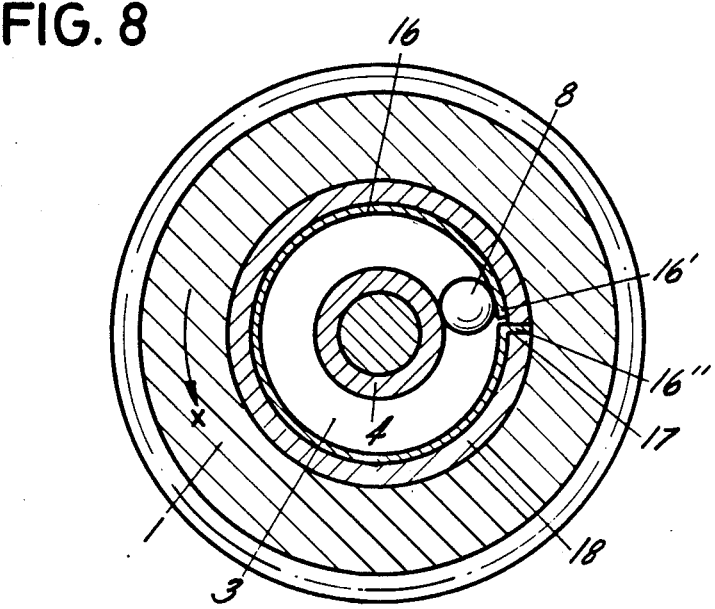
FIG. 8 is a showing corresponding to FIG. 7 during the disengagement when the limit moment is reached.

In the fourth embodiment, shown in FIGS. 7 and 8, identical structural parts have also been given the same reference numbers. Differing from the structural forms previously described, the resiliency section is formed by a leaf spring 16 which extends spirally into the annular space 3 in such a manner that the reduction in cross section increases towards the end 16' of the leaf spring. Its other end 16" lies within a radial groove 17 in the bushing-like drive element 18. The greater the resistance, the farther the driver body 8 passes towards the free end 16' of the leaf spring 16. If the moment of resistance at the driven element 4 is too great, then the driver body 8 completely passes through the reduction in cross section produced by the leaf spring 16, the leaf spring 16 necessarily moving into the arcuate slot 19 provided for it in the bushing 18; see FIG. 8.

Figure 9:
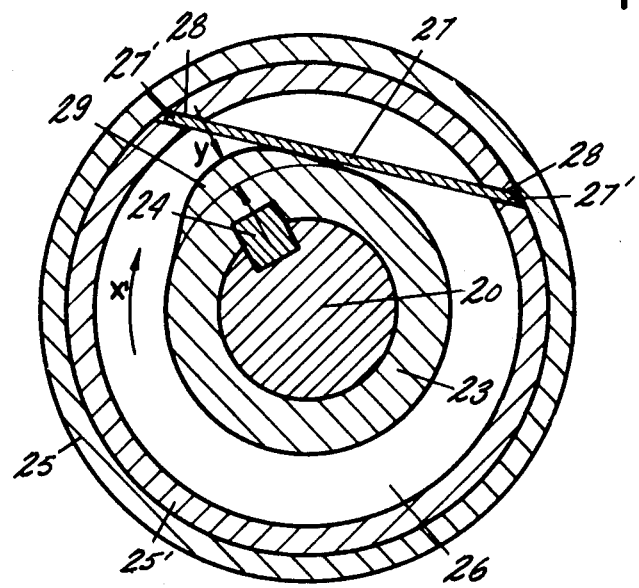
FIG. 9 is a cross section through the clutch according to the first embodiment, with the cam in the coupling position.
Figure 10:
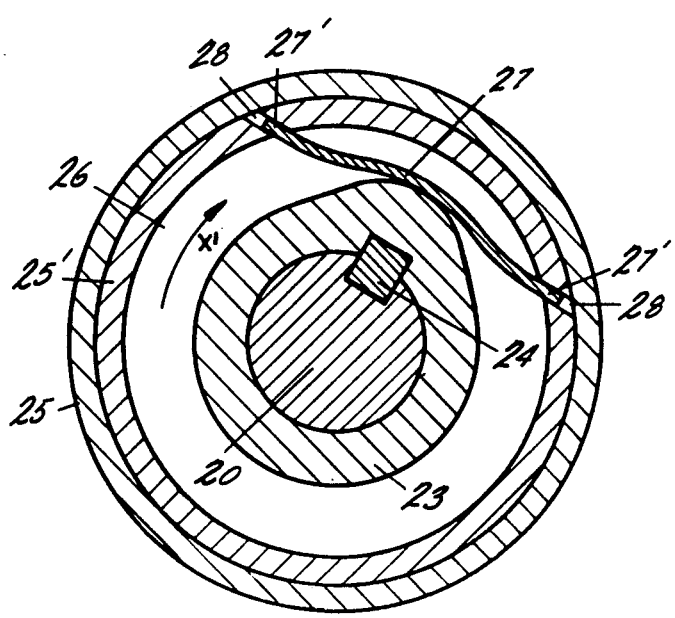
FIG. 10 is a view corresponding to FIG. 9, with the cam pressing the resiliency section outwards.

In accordance with the fifth embodiment, shown in FIGS. 9 and 10, the drive shaft driven by an appliance motor (not shown) is designated 20. A ring 23 is fastened fixed for rotation on this drive shaft 20. It is fixed thereon by an adjustment spring 24. The ring 23, in combination with a driven element 25 lying concentric to it, forms an annular space 26. The cross section thereof is reduced at one place by means of a resiliency section 27. In the present case, the resiliency section 27 is formed by a leaf spring which is arranged as a secant to the annular space 26. This spring has its ends 27' arranged in slolts 28 in the inner bushing 25' of the driven member 25. The reduction in cross section of the annular space 26 is such that the circumferential surface of the ring 23 is adjacent the resiliency section 27. The resiliency section 27 cooperates with a cam 29 which protrudes from the ring 23 and forms the driver body, the cam being formed by the development of the ring 23 itself. The cam 29 extends to the height of the adjustment spring 24. The vertex height y of the cam is, however, greater than the size of the annular space 26 in the region thereof which is reduced in cross section by the resiliency section 27.

If the drive shaft 20 together with the ring 23 and the cam 29 present thereon rotates in the direction indicated by the arrow x', then the cam 29 first of all comes against the resiliency section 27 and via the latter drives the driven element 25 along with it. When the maximum force limited by the vertex height of the cam and the strength of the spring is exceeded, we have the case, shown in FIG. 10, in which the cam 29 bends the resiliency section 27 outward. The cam 29 then moves in the direction of rotation away from the resiliency section 27. Until the cam 29 again makes contact with the resiliency section 27 there is no contact of these two parts with each other. Upon its further rotation the cam 29 again comes into contact with the resiliency section 27 and the transmission system is again in engagement. If the load torque has not yet dropped below the maximum permissible value, the process described above is repeated. In this way a noise is produced which calls the attention of the user to the fact that the load on the appliance provided with the clutch is too high.

Figure 11:
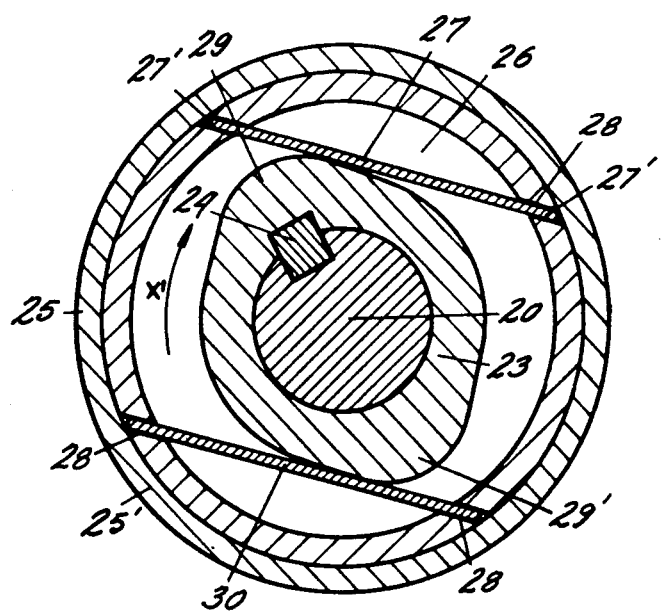
FIG. 11 is a cross section through the sixth embodiment of the clutch, in which two resiliency sections intersecting the annular space and two cams on the drive shaft are provided, shown in the coupling position.
Figure 12:
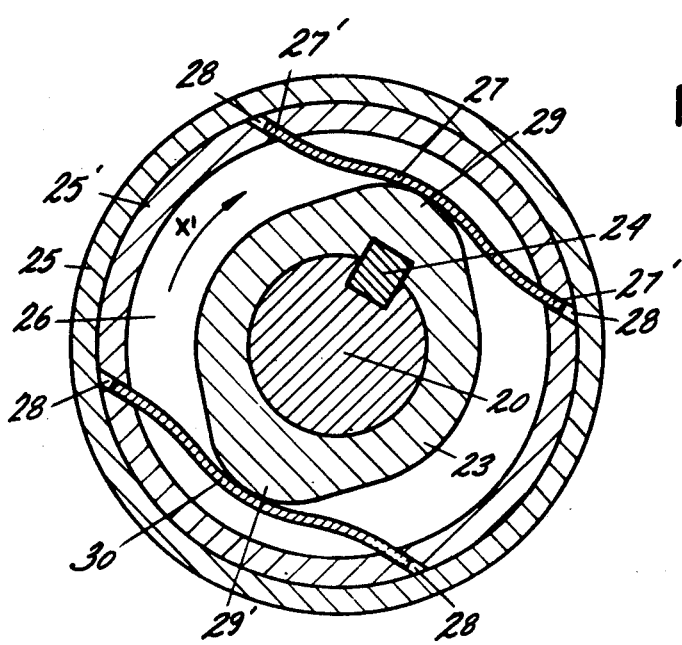
FIG. 12 is a view corresponding to FIG. 11, the cams having bent the resiliency sections outward.

In the sixth embodiment, shown in FIGS. 11 and 12, identical structural parts bear identical reference numbers. Different from the embodiment described above, an additional cam 29' is present on the ring 23 diametrically opposite the cam 29. The vertex heights of the two cams 29, 29' are the same. The annular space is furthermore crossed by another resiliency section 30. The arrangement thereof on the driven element 25 corresponds to the arrangement of the resiliency section 27. The two resiliency sections 27, 30 extend parallel to each other in such a manner that they are at the same distance from the drive axis. The manner of operation of this embodiment corresponds essentially to that of the embodiment described above.

Another embodiment is possible in the manner that, instead of the resiliency section 27, use is made of a bimetallic strip in the manner that the metal strip thereof which expands the most faces away from the cam 29. The two ends of the bimetallic strip can then be anchored firmly on the driven element 25. It is more favorable to firmly anchor only one end and leave the other end displaceable. When the limit torque is exceeded, the continuous sliding of the cam against the bottom of the bimetallic strip then leads to a heating of the latter so that it bends in the outward direction. There is then no contact between the cam and the bimetallic strip. The transmission system is now completely disengaged until the bimetallic strip has cooled down again.

Instead of two cams and two resiliency sections it would also be possible to provide a plurality of cams and resiliency sections in the same angular distribution. In such case even larger torques can be transmitted with smaller loads on cams and resiliency sections.

All new features set forth in the specification and shown in the drawing are essential to the invention even if they are not expressly claimed in the claims.

We claims:

1. An overload clutch apparatus of the type including a drive element and a driven element arranged concentrically with respect to each other defing an annular space therebetween, and a driver body provided in said space for coupling said drive element and said driven element by engaging one of said elements and a leaf spring on the other of said elements, said leaf spring extending in the annular space forming a reduced cross-section region of said annular space, said driver body comprising a rolling body, said rolling body further by bending out a section of the leaf spring which crosses the annular space effecting an uncoupling between said elements, the improvement wherein
    said rolling body is freely disposed in said annular space, and, respectively, drivably engageable with said leaf spring,
    a plurality of said leaf springs arranged adjacent each other to form secants to the annular space,
    said rolling body is a ball,
    each of said leaf springs are immediately adjacent each other and successive of the leaf springs have successively increasing lengths.

2. The apparatus according to claim 1, wherein
    said leaf springs of successively increasing length, respectively, form respectively successively increasing reductions of said reduced cross-section regions of said annular space forming a step-wise reduction of said annular space.

3. The apparatus according to claim 2, wherein
    one of said elements is an outermost of said elements, said leaf springs are respectively mounted in said outermost of said elements inwardly of respective evasion slots formed in said outermost element, said evasions slots respectively have successively increasing length corresponding to that of said leaf springs.

4. The apparatus according to claim 3, wherein
    an outwardly directed evasion space for the rolling body is formed in said outermost element adjacent a longest of said leaf springs.

5. The apparatus according to claim 4, wherein
    said evasion space is sized such that said rolling body is positionable therein with said rolling body out of contact with an innermost of said elements.

6. The apparatus according to claim 1, wherein
    said rolling body has a diameter substantially equal to the thickness of said annular space so as to be freely movable for orbiting therein.

* * * * *